(12) United States Patent
Sorrentino et al.

(10) Patent No.: US 11,042,557 B2
(45) Date of Patent: Jun. 22, 2021

(54) METHODS AND APPARATUS FOR PRESENTING SEARCH RESULTS ACCORDING TO A PRIORITY ORDER DETERMINED BY USER ACTIVITY

(71) Applicant: salesforce.com, inc., San Francisco, CA (US)

(72) Inventors: Glenn Sorrentino, San Francisco, CA (US); James David Vogt, San Bruno, CA (US); Steve Courtney, Palmdale, CA (US)

(73) Assignee: salesforce.com, inc., San Francisco, CA (US)

( * ) Notice: Subject to any disclaimer, the term of this patent is extended or adjusted under 35 U.S.C. 154(b) by 193 days.

(21) Appl. No.: 16/408,705

(22) Filed: May 10, 2019

(65) Prior Publication Data

US 2019/0266152 A1 Aug. 29, 2019

Related U.S. Application Data

(63) Continuation of application No. 14/872,238, filed on Oct. 1, 2015, now Pat. No. 10,331,689.

(51) Int. Cl.
*G06F 16/248* (2019.01)
*G06F 16/2457* (2019.01)

(52) U.S. Cl.
CPC ...... *G06F 16/248* (2019.01); *G06F 16/24578* (2019.01)

(58) Field of Classification Search
CPC .................. G06F 16/248; G06F 16/24578
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |

(Continued)

*Primary Examiner* — Jay A Morrison
(74) *Attorney, Agent, or Firm* — LKGlobal|Lorenz & Kopf, LLP

(57) ABSTRACT

A method for presenting a graphical user interface (GUI) of a software application connected to a server, the software application comprising at least a database, is provided. The method receives, at the server, user input comprising a search; generates, at the server, a set of search results based on the search, the set of search results being associated with entities of the software application, each of the entities comprising a respective database object containing predefined categories of data, the database comprising at least the database object; determines a priority order of the search results, based on user interaction history with the entities; and presents, via the GUI, the search results according to the priority order.

16 Claims, 7 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,562,069 B1 | 7/2009 | Chowdhury et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,694,529 B1 * | 4/2014 | Hotchkies ............ G06F 16/3349 707/766 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2006/0206834 A1 | 9/2006 | Fisher et al. |
| 2008/0201174 A1 * | 8/2008 | Ramasubramanian ..................... G16H 20/10 705/3 |
| 2008/0249972 A1 | 10/2008 | Dillon |
| 2009/0063414 A1 | 3/2009 | White et al. |
| 2009/0100342 A1 | 4/2009 | Jakobson |
| 2009/0164915 A1 | 6/2009 | Gasn et al. |
| 2009/0177744 A1 | 7/2009 | Marlow et al. |
| 2011/0010352 A1 * | 1/2011 | Jockisch ............... G06F 16/951 707/706 |
| 2011/0209094 A1 | 8/2011 | Gasn et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0115003 A1 | 4/2014 | Paymal et al. |
| 2014/0310608 A1 | 10/2014 | Snyder et al. |
| 2014/0365481 A1 | 12/2014 | Novosel et al. |
| 2015/0242495 A1 * | 8/2015 | Goldstein ........... G06F 16/9535 707/706 |
| 2015/0317945 A1 | 11/2015 | Andress et al. |
| 2015/0370861 A1 | 12/2015 | White et al. |

(56) References Cited

U.S. PATENT DOCUMENTS

2016/0078517 A1* 3/2016 Abe .................. G06Q 30/0625
                                                    705/26.62
2016/0088063 A1   3/2016 Cahn et al.
2016/0350669 A1* 12/2016 Jurka ................ G06F 16/24578

* cited by examiner

FIG. 3

| Top Results | Feed | Accounts | Contacts | Opportunities | Leads | Groups | Dashboards | Campaigns | More▾ |

Accounts
6 Results Sorted by Relevance

| Account Name | Account Owner | Created Date | Employees |
|---|---|---|---|
| Group A | John Doe | 4/1/2015 | 1,000 |
| Group B | Dave Smith | 3/30/2015 | 500 |
| Group C | Jane Jones | 12/22/2014 | 750 |
| Group D | John Doe | 1/18/2015 | 100 |
| Group E | Jane Jones | 10/5/2014 | 1 |

Opportunities
1 Result

| Opportunity Name | Opportunity Owner | Created Date | Amount | Stage |
|---|---|---|---|---|
| Group B - 1000 Licences | Jane Jones | 10/5/2014 | $25,000 | Closed - Won |

Contacts
0 Results

Leads
0 Results

○ Campaigns
○ Case Comments
○ Cases
○ Contracts
○ Files
○ Goals
○ Ideas
○ Marketing Requests
○ Orders
○ Packages
○ Products
○ Questions View all

METHODS AND APPARATUS FOR PRESENTING SEARCH RESULTS ACCORDING TO A PRIORITY ORDER DETERMINED BY USER ACTIVITY

CROSS-REFERENCE TO RELATED APPLICATION

This application is a continuation of U.S. patent application Ser. No. 14/872,238, filed Oct. 1, 2015, and issued on Jun. 25, 2019 as U.S. Pat. No. 10,331,689.

TECHNICAL FIELD

Embodiments of the subject matter described herein relate generally to the presentation of search results in a software application. More particularly, embodiments of the subject matter relate to arranging a set of search results according to a priority order that is based on user activity.

BACKGROUND

Enterprise software applications used in an organizational environment include a vast array of data. Certain software applications may include one or more multi-tenant databases, a conversation and/or news feeds, and social media features or other features for interactions within a group of users. Such software applications are useful in an organization that includes a large number of users.

When using the enterprise software application, users may search for information regarding topics of interest. However, because the enterprise software application includes such a large amount of data (e.g., in the multi-tenant database, in conversation feeds, news feeds, other social media features, etc.), search results may be cumbersome and unwieldy. Without a clear organization, a user may find himself needing to perform a search within a set of search results in order to locate relevant information.

Accordingly, it is desirable to organize a set of search results in a useful way. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for presenting a graphical user interface (GUI) of an enterprise software application connected to a server, the enterprise software application comprising at least a multi-tenant database. The method receives, at the server, user input comprising a search; generates, at the server, a set of search results based on the search, the set of search results being associated with entities of the enterprise software application, each of the entities comprising a respective database object containing predefined categories of data, the multi-tenant database comprising at least the database object; determines a priority order of the search results, based on user interaction history with the entities; and presents, via the GUI, the search results according to the priority order.

Some embodiments provide a system for presenting search results via a graphical user interface (GUI) of an enterprise software application connected to a server system, the enterprise software application comprising at least a multi-tenant database. The system includes: a client computer system communicatively coupled to the server system, the client computer system configured to: display the GUI; receive user input via the GUI, the user input comprising a search; and present a plurality of entities as user-selectable graphical elements of the GUI, based on a priority order determined by the server system; and the server system, configured to: evaluate the received user input; generate a set of search results based on the search, the set of search results being associated with entities of the enterprise software application, each of the entities comprising a database object containing data fitted into predefined categories, the multi-tenant database comprising at least the database object; determine a priority order of the search results, based on user interaction history with the entities; and transmit the priority order to the client computer system to alter presentation of the user-selectable graphical elements.

Some embodiments provide a non-transitory, computer-readable medium containing program instructions thereon, which are configurable such that, when executed by a processor, are capable of performing a method. The method determines a priority order for a plurality of entities associated with a multi-tenant database of an enterprise software application connected to a server, each of the plurality of entities comprising a database object containing data fitted into predefined categories, the multi-tenant database comprising at least the database object; and presents a set of user search results via a graphical user interface (GUI) of the enterprise software application, based on the determined priority order.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3 is a diagram of a graphical user interface (GUI) for presenting search results, in accordance with the disclosed embodiments;

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to apparatus and methods used to present search results, in an enterprise software application, according to a priority order. The priority order is based on an activity history associated with a particular user of the enterprise software application. Search results may be associated with a specific topic or aspect of the enterprise software application. For example, a multi-tenant database includes data organized into database objects (i.e., "entities"), and when a user conducts a search, the search results may be associated with one or more entities. Entities may be assigned a priority order, based on frequency of user activity with each entity, and search results may be presented, with an entity heading, in the priority order of the entities. Presenting search results in this way more prominently displays search results relevant to topics and other aspects of the enterprise software application that the user most frequently uses.

Figure 1:
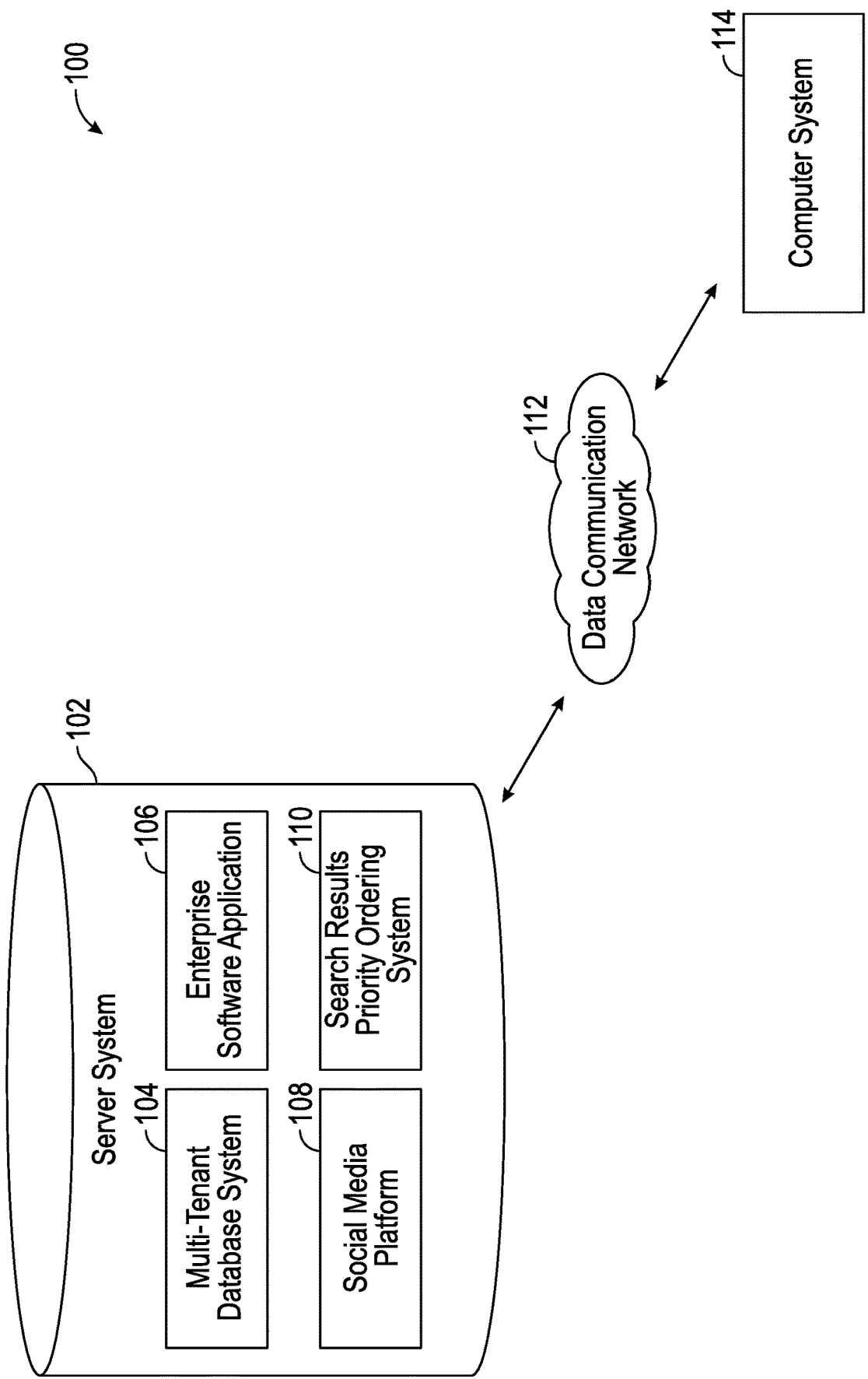
FIG. 1 is a diagram of a system for presenting search results in a priority order for an enterprise software application, in accordance with the disclosed embodiments.

Turning now to the figures, FIG. 1 is a diagram of a system 100 for presenting search results in a priority order for an enterprise software application 106, in accordance with the disclosed embodiments. As shown, the system 100 includes a computer system 114 for operation by a user. The computer system 114 may be implemented using a stand-alone personal computer, a portable computer (e.g., a laptop, a tablet computer, or a handheld computing device), a computer integrated into another device or system (e.g., a "smart" tv, a smartphone, or a smartwatch), or any other device or platform including at least one processor, some form of memory, and a user interface to allow a user to interact with the computer system 114. The user interface may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computer system 114.

The computer system 114 is capable of communicating with a remote server system 102 via a data communication network 112. The data communication network 112 may be any digital or other communications network capable of transmitting messages or data between devices, systems, or components. In certain embodiments, the data communication network 112 includes a packet switched network that facilitates packet-based data communication, addressing, and data routing. The packet switched network could be, for example, a wide area network, the Internet, or the like. In various embodiments, the data communication network 112 includes any number of public or private data connections, links or network connections supporting any number of communications protocols. The data communication network 112 may include the Internet, for example, or any other network based upon TCP/IP or other conventional protocols. In various embodiments, the data communication network 112 could also incorporate a wireless and/or wired telephone network, such as a cellular communications network for communicating with mobile phones, personal digital assistants, and/or the like. The data communication network 112 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

The server system 102 operates the enterprise software application 106 and search results priority ordering system 110. The server system 102 may include any number of application servers, and each server may be implemented using any suitable computer. In some embodiments, the server system 102 includes one or more dedicated computers. In some embodiments, the server system 102 includes one or more computers carrying out other functionality in addition to server operations. In exemplary embodiments, the server system 102 operates within a client-server architecture, executing programs to serve the requests of other programs (i.e., the clients). In this example, the computer system 114 acts as the client, and the server system 102 performs some tasks on behalf of computer system 114, to include providing the enterprise software application 106.

One or more application servers of the server system 102 maintains the enterprise software application 106. The enterprise software application 106 includes a multi-tenant database system 104 (as described in detail below, with regard to FIG. 7) and a social media platform 108. The social media platform 108 of the enterprise software application 106 includes a web-based social media interface which enables users to interact over the Internet or an intranet. Such interactions are made available to the user via user-accessible functionality of the social media platform. User-accessible functionality may include, without limitation: posting "status updates" to a feed, posting messages to a profile page, private messaging (e.g., email), instant messaging, tagging users in posts and/or messages, sharing documents or other files, and the like. Social media functions may be performed by individual users of the social media platform 108 or within specialized groups associated with the social media platform 108. The social media platform 108 allows users to share ideas, pictures, posts, activities, events, and interests with other users in their network. Examples of a social media platform 108 may include, without limitation: Facebook, Google+, LinkedIn, Instagram, Reddit, Pinterest, Vine, Tumblr, and Twitter. In one embodiment, for example, the social media platform 108 is implemented using the Chatter® collaboration platform provided by Salesforce.com, Inc. of San Francisco, Calif.

In some embodiments, the entire enterprise software application 106 may be specialized and operate as a tool for users of a particular organization. In this scenario, the multi-tenant database system 104 provides data storage and other functionality specific to the needs of the particular organization, and the social media platform 108 provides communication tools to facilitate communication between users of the particular organization. The enterprise software application 106 is configured to operate cooperatively with a search results priority ordering system 110, as described below with regard to FIG. 2. The search results priority ordering system 110 (i) prioritizes the entities (i.e., database objects) of the multi-tenant database, according to frequency of user interaction with the entities, and (ii) presents search results associated with each entity according to the priority of the entities.

Figure 2:
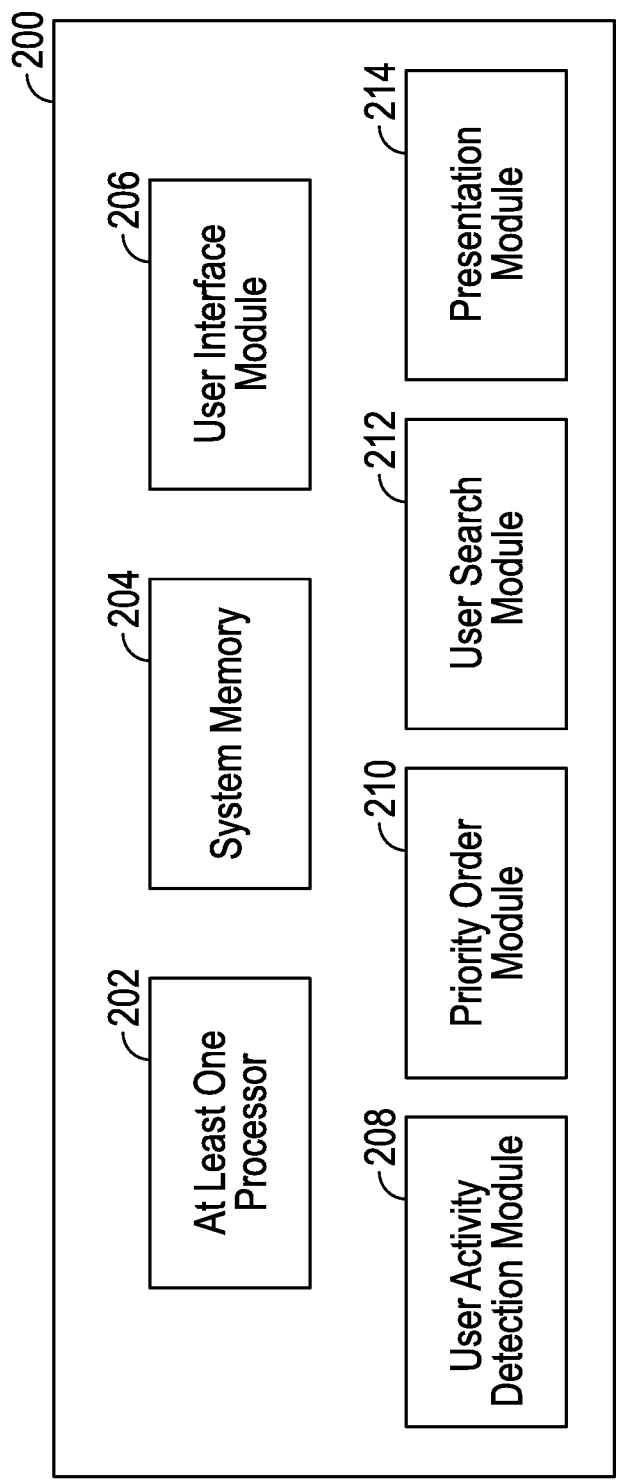
FIG. 2 is a functional block diagram of a software entity priority ordering system, in accordance with the disclosed embodiments.

FIG. 2 is a functional block diagram of a search results priority ordering system 200, in accordance with the disclosed embodiments. The search results priority ordering system 200 generally includes, without limitation: at least one processor 202; system memory 204; a user interface module 206; a user activity detection module 208; a priority order module 210; a user search module 212; and a presentation module 214. These elements and features of the search results priority ordering system 200 may be operatively associated with one another, coupled to one another, or otherwise configured to cooperate with one another as needed to support the desired functionality—in particular, presenting user search results associated with entities (i.e., database objects) in a priority order of the entities, as described herein. For ease of illustration and clarity, the various physical, electrical, and logical couplings and interconnections for these elements and features are not depicted in FIG. 2. Moreover, it should be appreciated that embodiments of the search results priority ordering system 200 will include other elements, modules, and features that cooperate to support the desired functionality. For simplicity, FIG. 2 only depicts certain elements that relate to the techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 communicates with system memory 204. The system memory 204 may be realized using any number of devices, components, or modules, as appropriate to the embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the at least one processor 202. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface module 206 may include or cooperate with various features to allow a user to interact with the search results priority ordering system 200 via an enterprise software application connected to a server system (described previously with respect to FIG. 1). Accordingly, the user interface module 206 may initiate the creation and maintenance of a graphical user interface (GUI), rendered on a display element. In certain embodiments, the display element implements touch-sensitive technology for purposes of interacting with the GUI. Thus, a user can manipulate the GUI by moving a cursor symbol rendered on the display element, or by physically interacting with the display element itself for recognition and interpretation. Using input keyboard commands and/or touch-screen commands (among other types of input commands), the user could manipulate the GUI to interact with an enterprise software application to access and view various multi-tenant database features and/or social media features associated with the enterprise software application.

In particular, the user interface module 206 presents graphical elements associated with performing a search of the enterprise software application. Generally, the user interface module 206 provides a graphical element at which a user may manually input one or more search terms, including words or phrases, in order to search for and locate content of the enterprise software application related to the search terms. Once a user search has been performed by the enterprise software application, the user interface module 206 is further configured to present user-selectable graphical elements associated with entities of the software application and search results associated with each entity.

The user activity detection module 208 is configured to detect user activity at the enterprise software application over a period of time, and to identify entities of the enterprise software application associated with the detected user activity. In the context of the present disclosure, an entity or data object is considered to be "interacted" with when it satisfies any desired predetermined and/or configurable interaction criteria. In one embodiment, an entity is interacted with when any record in it is opened; that is, the user "drills down" into the object by opening, clicking on, editing, revising, saving, or otherwise interacting with at least one data record within an object. For example, a user may perform an action at the multi-tenant database, such as making a change to a record. The record may be associated with a database object (i.e., a software entity), such as an "account" entity. When the change to the record is made, the user activity detection module 208 identifies the user, recognizes the change, and records the use of the database object applicable to the user action (e.g., the "account" entity). As a second example, a user may perform another action at the multi-tenant database, such as creating a new record associated with a "contact" entity. When the new record is created, the user activity detection module 208 recognizes creation of the record, identifies the user that created the record, and records the use of the database object to which the record is associated (e.g., the "contact" entity).

The priority order module 210 is configured to recognize the levels of user activity associated with each software application entity (as detected by the user activity detection module 208), and to determine a priority order for each entity based on the applicable user activity level. The priority order module 210 identifies which software application entity is used the most, which software entity is used the least, and software entities having user activity levels between the most activity and the least activity. When the priority order module 210 has identified the activity levels of each entity, the priority order module 210 creates an ordered list of the entities, which begins with the entity associated with the highest activity level, ends with the entity associated with the lowest activity level, and lists the entities between these two according to their activity levels, from the most activity to the least activity.

The user search module 212 is configured to receive user input search terms, including words or phrases associated with content that a user is attempting to locate in the data stores of the enterprise software application. The user search module 212 then performs the search of the content accessible to the user via the multi-tenant database and the social media functionality of the enterprise software application.

The presentation module 214 operates cooperatively with the user interface module 206 to display search results obtained by the user search module 212 in order of priority, as determined by the priority order module 210. The presentation module 214 receives data indicating the priority order of the entities and rearranges graphical elements representing the entities on a "search results" interface of the GUI to reflect the priority order. The presentation module 214 then initiates the display of search results associated with each entity using the reordered and rearranged graphical elements.

In practice, the user interface module 206, the user activity detection module 208, the priority order module 210, the user search module 212, and/or the presentation module 214 may be implemented with (or cooperate with) the at least one processor 202 to perform at least some of the functions and operations described in more detail herein. In this regard, the user interface module 206, the user activity detection module 208, the priority order module 210, the user search module 212, and/or the presentation module 214 may be realized as suitably written processing logic, application program code, or the like.

FIG. 3 is a diagram of a graphical user interface (GUI) 300 for presenting search results, in accordance with the disclosed embodiments. As shown, the GUI 300 includes icons 302 along the left side of the interface. The icons 302 are user-selectable, and each icon 302 represents an entity of the enterprise software application. By selecting one of the icons 302, the user accesses the associated entity. Here, the user is taken to the landing page for the entity. Global searches from the entity landing page are weighted in relevancy per that selected entity. A search field 304 is located at the top of the GUI 300. Here, a user may enter search terms to perform a search function in the enterprise software application. Search terms may include words or phrases for which a user seeks related content of the enterprise software application. The search field 304 is displayed at the GUI 300 for presenting search results, and also may be displayed on other graphical interfaces of the enterprise software application, enabling a user to conduct a search from one or more locations.

The GUI 300 for presenting search results includes a ribbon 306 of user-selectable options, the ribbon 306 being located above the presented search results and below the search field 304. The user-selectable options of the ribbon 306 may be selected in order to view one or more particular portions of a set of search results. The first two user-selectable options of the ribbon 306 are static. In other words, "Top Results" and "Feed" are always located in the first and second positions and do not change position. Similarly, the drop-down menu labeled "More" is a static graphical element that is always located at the end position of the ribbon 306, and does not change position.

Outside of the three described static elements (e.g., "Top Results", "Feed", and "More"), each of the user-selectable options is arranged in the ribbon 306 in a priority order. The priority order is determined based on user activity levels associated with each entity. As shown, the priority order is Accounts, Contacts, Opportunities, Leads, Groups, Dashboards, Campaigns, Case Comments, Cases, Contracts, Files, Goals, Ideas, Marketing Requests, Orders, Packages, Products, and Questions. The first seven entities are presented in the ribbon 306, and the next eleven entities are listed in the drop-down menu (i.e., "More") due to lack of screen-space. In this particular example, a total of eighteen entities are included in the GUI 300. However, any number of applicable entities may be included in the GUI 300, and additional entities may be listed in the drop-down menu (i.e., "More") in priority order.

The first shown user-selectable option of the ribbon 306 is the static option "Top Results". In the example shown, "Top Results" is underlined, indicating that "Top Results" is the currently selected option. When selected, "Top Results" presents a summary or snapshot of the set of search results. This summary includes a list of entities and, below each listed entity, a truncated list of search results associated with that particular entity are listed. Each entity is presented as a heading for a truncated listing of associated search results. This truncated list of search results may include a specific number of the most relevant search results of the applicable entity. For this particular example, the "Accounts" entity is listed first, and below the heading "Accounts" is a list of six search results, which are sorted by relevance to the user-entered search. Here, the six listed search results may be the total number of search results related to "Accounts", may be the most relevant six search results of a much larger set of search results for the "Accounts" entity. Following the "Accounts" entity, the "Opportunities" entity is listed, and below the heading "Opportunities" is a list that includes only one result.

Here, search results associated with the "Accounts" entity are listed first because the user activity levels for "Accounts" were the highest, indicating that the user interacted with the "Accounts" entity more than any other entity. This priority position of the "Accounts" entity is also reflected in the position of "Accounts" in the ribbon 306 itself. Generally, the entities presented as user-selectable options in the ribbon 306 are displayed in the same priority order in the ribbon 306 and in the search results. In this particular example, the "Contacts" entity is listed after the "Opportunities" entity because those entities associated with zero search results are moved to the bottom of the "Top Results" list.

The second user-selectable option of the ribbon 306 is the static graphical element "Feed". In the example shown, "Feed" is not underlined, indicating that "Feed" is not the currently selected option. When selected, "Feed" presents search results associated with conversations and/or other items posted in a "news feed" of the enterprise software application that are relevant to the search terms entered by a user into the search field 304. In the current example, because "Feed" is a static graphical element, it is positioned outside of the priority order and does not change positions when user activity levels for each entity change.

Figure 4:
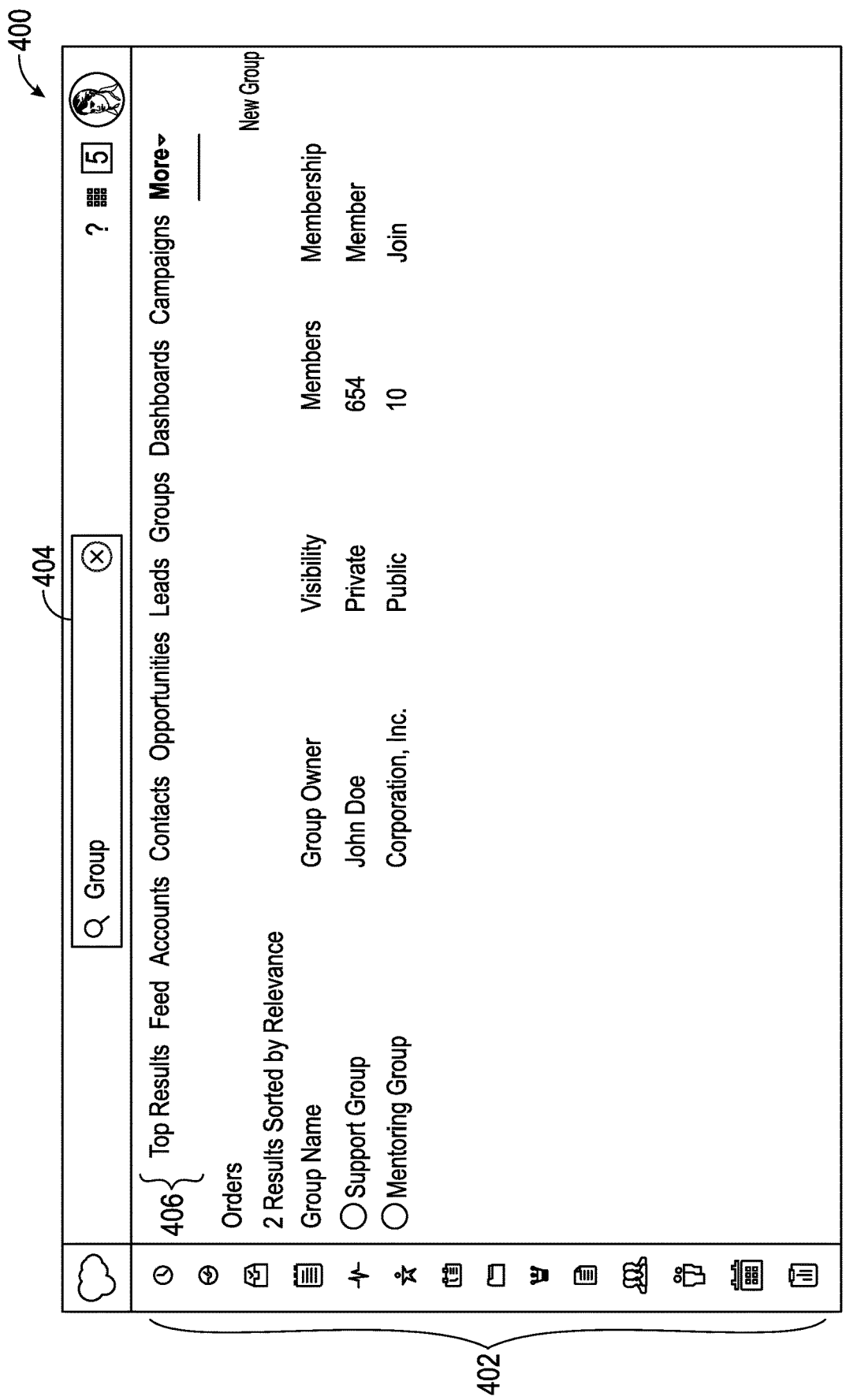
FIG. 4 is another diagram of the GUI for presenting search results, in accordance with the disclosed embodiments.

As shown, the drop-down menu labeled "More" is selected, and the entity "Orders" is shaded, indicating that the cursor is hovering over "Orders" in the drop-down menu for potential selection. Once selected, the interface changes to that shown in FIG. 4, which is another diagram of the GUI 400 (see reference 300 in FIG. 3), in accordance with the disclosed embodiments. Here, the GUI 400 includes the icons 402, the search field 404, and the ribbon 406, that were previously described with respect to FIG. 3. The GUI 400 also shows underlining under the drop-down menu labeled "More", because the "Orders" entity has been selected from the drop-down menu. Here, a search has been performed by a user that entered the search term "group" in the search field 404, and because the "Orders" entity has been selected, only the search results associated with the "Orders" entity are shown.

Figure 5:
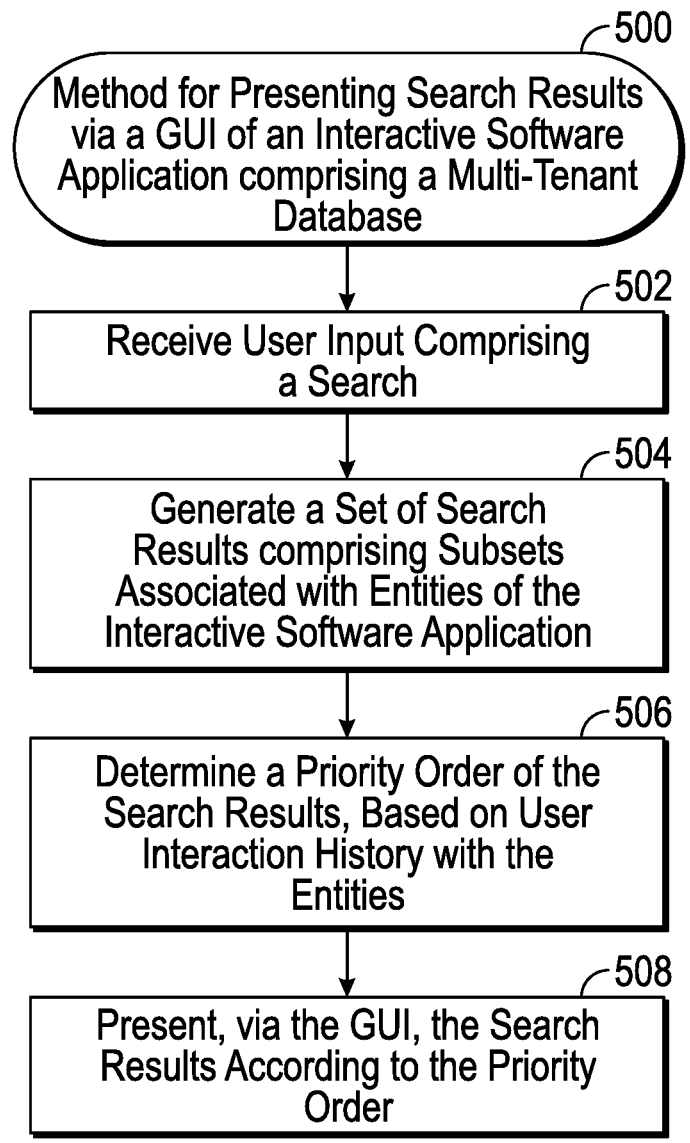
FIG. 5 is a flow chart that illustrates an embodiment of a process for presenting search results via a GUI of an enterprise software application.

FIG. 5 is a flow chart that illustrates an embodiment of a process 500 for presenting search results via a graphical user interface (GUI) of an enterprise software application comprising a multi-tenant database. The various tasks performed in connection with process 500 may be performed by software, hardware, firmware, or any combination thereof. For illustrative purposes, the following description of process 500 may refer to elements mentioned above in connection with FIGS. 1-4. In practice, portions of process 500 may be performed by different elements of the described system. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein. Moreover, one or more of the tasks shown in FIG. 5 could be omitted from an embodiment of the process 500 as long as the intended overall functionality remains intact.

First, the process 500 receives user input comprising a search (step 502). A user may enter any desired search term, to include words or phrases, in order to locate content of the enterprise software application relevant to the search terms. Searched content of the enterprise software application may include content saved in one or more multi-tenant databases associated with the enterprise software application, social media content of the enterprise software application, or any other content associated with the enterprise software application.

Next, the process 500 generates a set of search results based on the search, the set of search results being associated with entities of the enterprise software application (step 504). Content of the enterprise software application is associated with entities of the software application. Some content of the enterprise software application is stored in the multi-tenant database, the multi-tenant database comprising a plurality of database objects containing predefined categories of data. In certain embodiments, an entity may be a database object of the one or more associated multi-tenant databases. In some embodiments, an entity may be associated with the social media aspect of the enterprise software application, and include news feed and conversation feed items. In some embodiments, an entity may be any other designated sub-category of data relevant to the enterprise software application. Sub-categories of information may be inherent to the enterprise software application, or may be designated by a user by creating custom entities. Since all content is associated with an entity of the enterprise software application, search results may be organized and presented using the associated entities. For example, entity names may be used as topics, headings, or labels, or other indications of an associated entity.

The process 500 determines a priority order of the search results, based on user interaction history with the entities (step 506). One suitable methodology for determining a priority order of the search results is described below with reference to FIG. 6. The priority order may be determined before or after the set of search results is generated. In certain embodiments, the priority order is determined according to a timed interval schedule. In some embodiments, however, the priority order is determined on an as-needed basis, such as when a search is performed or when a user logs into the enterprise software application. The priority order is determined based on user activity associated with each entity. Higher priority is assigned with entities that are frequently involved in user activity, and lower priority is assigned to entities that are less frequently involved in user activity.

After generating the search results (step 504) and determining the priority order of the search results (step 506), the process 500 presents, via the GUI, the search results according to the priority order (step 508). In this way, the entities that a particular user accesses frequently, and in which the user is likely more interested, are assigned the higher priority. Search results associated with higher priority entities are presented in a more prominent position in the GUI, as described in more detail below with respect to FIG. 6.

Figure 6:
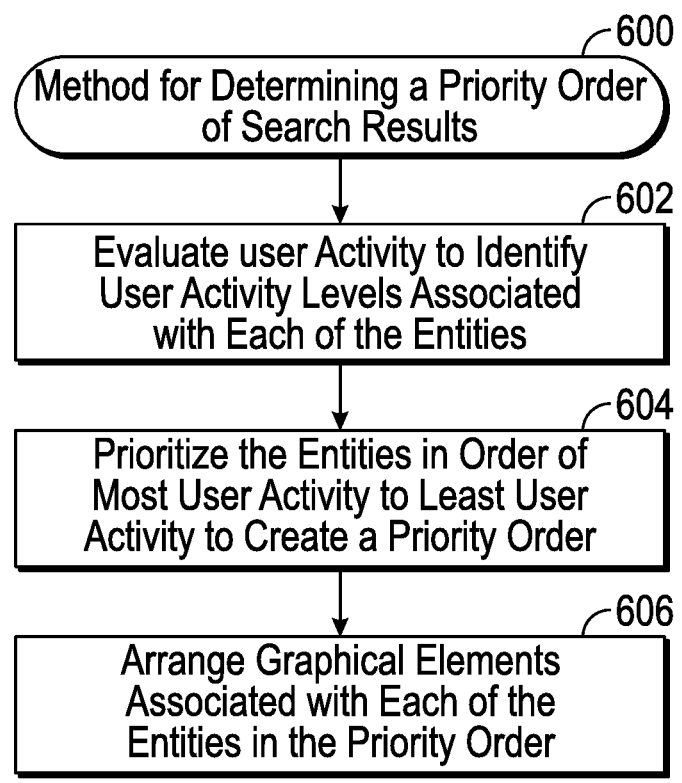
FIG. 6 is a flow chart that illustrates an embodiment of a process for determining a priority order of a set of search results.

FIG. 6 is a flow chart that illustrates an embodiment of a process for determining a priority order of a set of search results. It should be appreciated that the process 600 described in FIG. 6 represents one embodiment of step 506 described above in the discussion of FIG. 5, including additional detail. First, the process 600 evaluates user activity to identify user activity levels associated with each of the entities (step 602). In the context of the present disclosure, an entity or data object is considered to be "interacted" with when it satisfies any desired predetermined and/or configurable interaction criteria. In one embodiment, an entity is interacted with when any record in it is opened; that is, the user "drills down" into the object by opening, clicking on, editing, revising, saving, or otherwise interacting with at least one data record within an object. When a user interacts with a particular entity of the enterprise software application, the process 600 records the interaction. For a particular user, the interaction history with an entity is aggregated to determine an activity level associated with that entity.

Next, the process 600 prioritizes the entities in order of most user activity to least user activity to create a priority order (step 604). Here, the process 600 compares the determined activity levels to identify the most user activity, the least user activity, and the activity levels between the most activity and the least activity. The priority order is essentially a listing of each entity of the enterprise software application organized from the most activity to the least activity. Here, the entity with most user activity receives the highest priority position, the entity with the least user activity receives the lowest priority position, and the remaining entities are ordered between the highest priority position and the lowest priority position, based on the entities' activity levels.

The process 600 then arranges graphical elements associated with each of the entities according to the priority order (step 606). Each graphical element is representative of a single entity, and search results are presented using the graphical elements. Since the graphical elements are arranged according to the priority order, the search results are thus presented according to the priority order. In some embodiments, each graphical element associated with an entity may be presented as a user-selectable tab. In exemplary embodiments, a plurality of user-selectable tabs may be presented as a ribbon, which is generally displayed at the top of the GUI and/or above the search results, from which any of the tabs may be selected.

The process 600 may detect a plurality of graphical elements of the GUI in the form of user-selectable tabs, and identify a current placement of the user-selectable tabs. When the user-selectable tabs are arranged in a ribbon, the process 600 identifies the ordered placement of the user-selectable tabs in the ribbon from left to right. The identified placement indicates a previously determined priority order, which may or may not continue to represent the newly-determined priority order based on current user activity levels. To arrange the graphical elements according to the priority order (step 606), the process 600 reorganizes the placement of the user-selectable tabs into the newly-determined priority order.

Once the user-selectable tabs are reordered according to the current priority order, the process 600 may identify a subset of the search results relevant to an entity and associate the subset of the search results with the appropriate user-selectable tab. When selected, the user-selectable tab presents the subset of the search results relevant to the associated entity. In other embodiments, each entity may be presented as any type of graphical element which may be arranged (and rearranged, as necessary) and displayed according to the priority order. For example, an entity that is not associated with any of the user-selectable tabs may be presented as a user-selectable option on a drop-down menu and, when the entity is selected from the drop-down menu, a subset of the search results that is associated with the entity is displayed.

In the example of the ribbon, the user-selectable tabs are reorganized to place the highest priority tab in the left-most position of the ribbon, and the lowest priority tab in the right-most position of the ribbon. In certain embodiments, the left-most and right-most positions of the ribbon are occupied by the placement of static graphical elements, which may limit the available positions of the graphical elements to those unoccupied by static graphical elements. In certain embodiments, the number of entities exceeds that which can be presented onscreen, and a set of the user-selectable tabs is presented, in priority order, via a drop-down menu. The drop-down menu may be a static graphical element in any position of the ribbon, and may present a highest priority set of tabs representative of entities, a lowest priority set of tabs representative of entities, or any set of tabs in the priority order. Exemplary embodiments utilize a drop-down menu as a static graphical element to display the lowest priority user-selectable tabs which are not easily displayed onscreen due to size constraints. In this particular example, the drop-down menu is presented as a user-selection of the ribbon, which is positioned outside of the priority order of the remaining user-selectable tabs.

Figure 7:
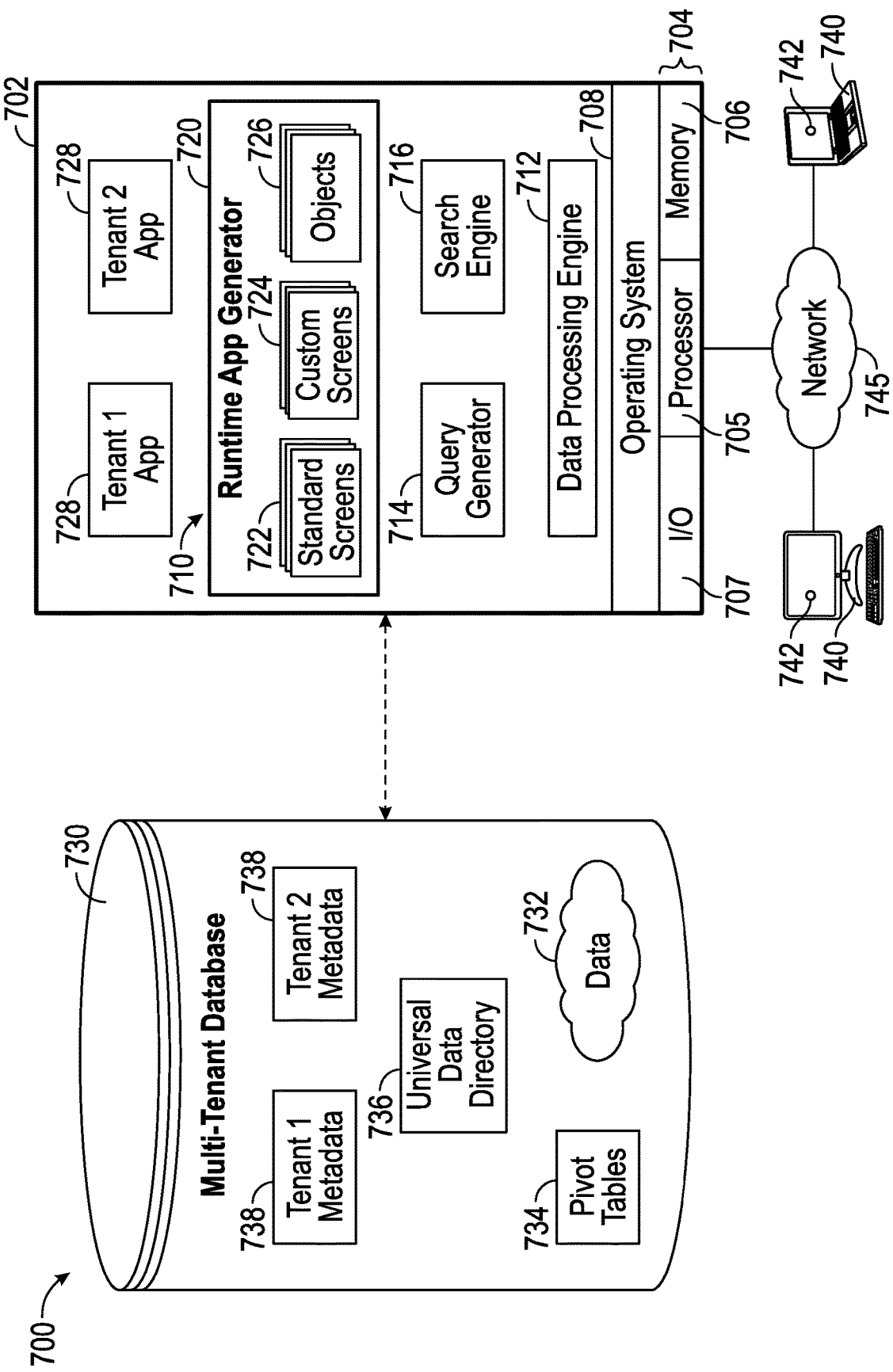
FIG. 7 is a block diagram of an exemplary multi-tenant database system suitable for use with the system of FIG. 1, in accordance with the disclosed embodiments.

FIG. 7 depicts an exemplary embodiment of a multi-tenant database system 700 suitable for use in conjunction with the enterprise software application 106 and search results priority ordering system 110 of FIG. 1. The illustrated multi-tenant database system 700 of FIG. 7 includes a server 702 (e.g., server system 102) that dynamically creates and supports virtual applications 728 based upon data 732 from a common database 730 (e.g., multi-tenant database system 104) that is shared between multiple tenants, alternatively referred to herein as a multi-tenant database. Data and services generated by the virtual applications 728 are provided via a network 745 (e.g., data communication network 112) to any number of client devices 740 (e.g., computer system 114, or the like), as desired. Each virtual application 728 is suitably generated at run-time (or on-demand) using a common application platform 710 that securely provides access to the data 732 in the database 730 for each of the various tenants subscribing to the multi-tenant system 700. In accordance with one non-limiting example, the multi-tenant system 700 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 730. In this regard, each tenant includes one or more users associated with, assigned to, or otherwise belonging to that respective tenant. To put it another way, each respective user within the multi-tenant system 700 is associated with, assigned to, or otherwise belongs to a particular tenant of the plurality of tenants supported by the multi-tenant system 700. Tenants may represent customers, customer departments, business or legal organizations, and/or any other entities that maintain data for particular sets of users within the multi-tenant system 700 (i.e., in the multi-tenant database 730). For example, the application server 702 may be associated with one or more tenants supported by the multi-tenant system 700. Although multiple tenants may share access to the server 702 and the database 730, the particular data and services provided from the server 702 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 732 belonging to or otherwise associated with other tenants.

The multi-tenant database 730 is any sort of repository or other data storage system capable of storing and managing the data 732 associated with any number of tenants. The database 730 may be implemented using any type of conventional database server hardware. In various embodiments, the database 730 shares processing hardware 704 with the server 702. In other embodiments, the database 730 is implemented using separate physical and/or virtual database server hardware that communicates with the server 702 to perform the various functions described herein. In an exemplary embodiment, the database 730 includes a database management system or other equivalent software capable of determining an optimal query plan for retrieving and providing a particular subset of the data 732 to an instance of virtual application 728 in response to a query initiated or otherwise provided by a virtual application 728. The multi-tenant database 730 may alternatively be referred to herein as an on-demand database, in that the multi-tenant database 730 provides (or is available to provide) data at run-time to on-demand virtual applications 728 generated by the application platform 710.

In practice, the data 732 may be organized and formatted in any manner to support the application platform 710. In various embodiments, the data 732 is suitably organized into a relatively small number of large data tables to maintain a semi-amorphous "heap"-type format. The data 732 can then be organized as needed for a particular virtual application 728. In various embodiments, conventional data relationships are established using any number of pivot tables 734 that establish indexing, uniqueness, relationships between entities, and/or other aspects of conventional database organization as desired. Further data manipulation and report formatting is generally performed at run-time using a variety of metadata constructs. Metadata within a universal data directory (UDD) 736, for example, can be used to describe any number of forms, reports, workflows, user access privileges, business logic and other constructs that are common to multiple tenants. Tenant-specific formatting, functions and other constructs may be maintained as tenant-specific metadata 738 for each tenant, as desired. Rather than forcing the data 732 into an inflexible global structure that is common to all tenants and applications, the database 730 is organized to be relatively amorphous, with the pivot tables 734 and the metadata 738 providing additional structure on an as-needed basis. To that end, the application platform 710 suitably uses the pivot tables 734 and/or the metadata 738 to generate "virtual" components of the virtual applications 728 to logically obtain, process, and present the relatively amorphous data 732 from the database 730.

The server 702 is implemented using one or more actual and/or virtual computing systems that collectively provide the dynamic application platform 710 for generating the virtual applications 728. For example, the server 702 may be implemented using a cluster of actual and/or virtual servers operating in conjunction with each other, typically in association with conventional network communications, cluster management, load balancing and other features as appropriate. The server 702 operates with any sort of conventional processing hardware 704, such as a processor 705, memory 706, input/output features 707 and the like. The input/output features 707 generally represent the interface(s) to networks (e.g., to the network 745, or any other local area, wide area or other network), mass storage, display devices, data entry devices and/or the like. The processor 705 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 706 represents any non-transitory short or long term storage or other computer-readable media capable of storing programming instructions for execution on the processor 705, including any sort of random access memory (RAM), read only memory (ROM), flash memory, magnetic or optical mass storage, and/or the like. The computer-executable programming instructions, when read and executed by the server 702 and/or processor 705, cause the server 702 and/or processor 805 to create, generate, or otherwise facilitate the application platform 710 and/or virtual applications 728 and perform one or more additional tasks, operations, functions, and/or processes described herein. It should be noted that the memory 706 represents one suitable implementation of such computer-readable media, and alternatively or additionally, the server 702 could receive and cooperate with external computer-readable media that is realized as a portable or mobile component or application platform, e.g., a portable hard drive, a USB flash drive, an optical disc, or the like.

The application platform 710 is any sort of software application or other data processing engine that generates the virtual applications 728 that provide data and/or services to the client devices 740. In a typical embodiment, the application platform 710 gains access to processing resources, communications interfaces and other features of the processing hardware 704 using any sort of conventional or proprietary operating system 708. The virtual applications 728 are typically generated at run-time in response to input received from the client devices 740. For the illustrated embodiment, the application platform 710 includes a bulk data processing engine 712, a query generator 714, a search engine 716 that provides text indexing and other search functionality, and a runtime application generator 720. Each of these features may be implemented as a separate process or other module, and many equivalent embodiments could include different and/or additional features, components or other modules as desired.

The runtime application generator 720 dynamically builds and executes the virtual applications 728 in response to specific requests received from the client devices 740. The virtual applications 728 are typically constructed in accordance with the tenant-specific metadata 738, which describes the particular tables, reports, interfaces and/or other features of the particular application 728. In various embodiments, each virtual application 728 generates dynamic web content that can be served to a browser or other client program 742 associated with its client device 740, as appropriate.

The runtime application generator 720 suitably interacts with the query generator 714 to efficiently obtain multi-tenant data 732 from the database 730 as needed in response to input queries initiated or otherwise provided by users of the client devices 740. In a typical embodiment, the query generator 714 considers the identity of the user requesting a particular function (along with the user's associated tenant), and then builds and executes queries to the database 730 using system-wide metadata 736, tenant specific metadata 738, pivot tables 734, and/or any other available resources. The query generator 714 in this example therefore maintains security of the common database 730 by ensuring that queries are consistent with access privileges granted to the user and/or tenant that initiated the request. In this manner, the query generator 714 suitably obtains requested subsets of data 732 accessible to a user and/or tenant from the database 730 as needed to populate the tables, reports or other features of the particular virtual application 728 for that user and/or tenant.

Each database 730 can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems 700, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems 700, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system 700. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Still referring to FIG. 7, the data processing engine 712 performs bulk processing operations on the data 732 such as uploads or downloads, updates, online transaction processing, and/or the like. In many embodiments, less urgent bulk processing of the data 732 can be scheduled to occur as processing resources become available, thereby giving priority to more urgent data processing by the query generator 714, the search engine 716, the virtual applications 728, etc.

In exemplary embodiments, the application platform 710 is utilized to create and/or generate data-driven virtual applications 728 for the tenants that they support. Such virtual applications 728 may make use of interface features such as custom (or tenant-specific) screens 724, standard (or universal) screens 722 or the like. Any number of custom and/or standard objects 726 may also be available for integration into tenant-developed virtual applications 728. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 726 such as "account" objects, "opportunity" objects, "contact" objects, or the like. The data 832 associated with each virtual application 728 is provided to the database 730, as appropriate, and stored until it is requested or is otherwise needed, along with the metadata 738 that describes the particular features (e.g., reports, tables, functions, objects, fields, formulas, code, etc.) of that particular virtual application 728. For example, a virtual application 728 may include a number of objects 726 accessible to a tenant, wherein for each object 726 accessible to the tenant, information pertaining to its object type along with values for various fields associated with that respective object type are maintained as metadata 738 in the database 730. In this regard, the object type defines the structure (e.g., the formatting, functions and other constructs) of each respective object 726 and the various fields associated therewith.

Still referring to FIG. 7, the data and services provided by the server 702 can be retrieved using any sort of personal computer, mobile telephone, tablet or other network-enabled client device 740 on the network 745. In an exemplary embodiment, the client device 740 includes a display device, such as a monitor, screen, or another conventional electronic display capable of graphically presenting data and/or information retrieved from the multi-tenant database 730. Typically, the user operates a conventional browser application or other client program 742 executed by the client device 740 to contact the server 702 via the network 745 using a networking protocol, such as the hypertext transport protocol (HTTP) or the like. The user typically authenticates his or her identity to the server 702 to obtain a session identifier ("SessionlD") that identifies the user in subsequent communications with the server 702. When the identified user requests access to a virtual application 728, the runtime application generator 720 suitably creates the application at run time based upon the metadata 738, as appropriate. As noted above, the virtual application 728 may contain Java, ActiveX, or other content that can be presented using conventional client software running on the client device 740; other embodiments may simply provide dynamic web or other content that can be presented and viewed by the user, as desired.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to multi-tenancy, cloud computing, on-demand applications, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for presenting a graphical user interface (GUI) of a software application connected to a server, the software application comprising a database, the method comprising:
   receiving user input comprising a search, by the server via the GUI, wherein the GUI comprises at least a search query box and a ribbon of user-selectable tabs arranged in a first priority order, each of the user-selectable tabs corresponding to one of a plurality of entities of the software application, and each of the plurality of entities comprising a database object of the database;
   generating, by the server, a set of search results based on the search, the set of search results being associated with the plurality of entities of the software application, each of the plurality of entities comprising a respective database object containing predefined categories of data, the database comprising at least the database object;
   determining a second priority order of the search results, based on user interaction history with each of the plurality of entities, the second priority order prioritizing the plurality of entities in order of most user activity to least user activity;
   rearranging the user-selectable tabs of the ribbon according to the second priority order, by the server, to create a set of reordered user-selectable tabs;
   presenting, via the GUI, the search results in the second priority order and according to the set of reordered user-selectable tabs, by:
     receiving a user input selection of a first user-selectable tab associated with a first one of the entities, wherein the set of reordered user-selectable tabs includes the first user-selectable tab;
     identifying, in response to the user input selection, a first subset of the search results associated with the first one of the entities; and
     displaying the first subset on a first user-selectable tab associated with the first one of the entities; and
   presenting a truncated list of the set of search results, based on the second priority order, the truncated list comprising component truncated lists of the set of search results, and each of the component truncated lists being associated with a respective one of the entities, and each of the component truncated lists comprising a heading associated with a respective one of the entities.

2. The method of claim 1, wherein determining the second priority order further comprises:
   evaluating the user interaction history with the entities to identify activity levels associated with each of the entities;
   prioritizing the entities in order of most user activity to least user activity, to create the second priority order; and
   arranging graphical elements associated with the entities in the second priority order;
   wherein presenting the search results via the GUI further comprises displaying the search results using the graphical elements.

3. The method of claim 1, further comprising:
   detecting a plurality of user-selectable tabs on the GUI, the plurality of user-selectable tabs comprising the first user-selectable tab, and each of the plurality of user-selectable tabs being associated with a respective one of the entities, and each of the plurality of user-selectable tabs being configured to present a corresponding subset of the search results associated with the respective one of the entities; and
   identifying a current placement of each of the plurality of user-selectable tabs;
   wherein the presenting step further comprises reorganizing the current placement of each of the plurality of user-selectable tabs, based on the second priority order.

4. The method of claim 3, further comprising:
   identifying an individual one of the entities that is not associated with the plurality of user-selectable tabs;
   presenting the individual one of the entities on a drop-down menu, the individual one of the entities being associated with a subset of the search results; and
   when the individual one of the entities is selected via the drop-down menu, displaying the subset of the search results.

5. The method of claim 4, wherein the drop-down menu comprises a static graphical element positioned outside of the second priority order.

6. The method of claim 1, further comprising:
   presenting the truncated list as a static graphical element positioned outside of the second priority order.

7. The method of claim 1, further comprising:
   presenting a feed of conversations associated with the search, the search results comprising at least the feed.

8. The method of claim 7, the presenting step further comprising displaying the feed as a static graphical element of the GUI, and the static graphical element being positioned outside of the second priority order.

9. A system for presenting search results via a graphical user interface (GUI) of a software application comprising a database, the system comprising:
   a client computer system communicatively coupled to the server system, the client computer system configured to:
     display the GUI;
     receive user input via the GUI, the user input comprising a search, the GUI comprising at least a search query box and a ribbon of user-selectable tabs arranged in a first priority order, and each of the user-selectable tabs corresponding to one of a plurality of entities of the software application, and each of the plurality of entities comprising a database object of the database; and present a plurality of entities as user-selectable graphical elements of the GUI, based on a priority order determined by the server system; and a server system configured to:

evaluate the received user input;

generate a set of search results based on the search, the set of search results being associated with the plurality of entities of the software application, and each of the plurality of entities comprising a database object containing data fitted into predefined categories, and the database comprising at least the database object;

determine a second priority order of the search results, based on user interaction history with each of the plurality of entities, the second priority order prioritizing the plurality of entities in order of most user activity to least user activity;

rearrange the user-selectable tabs of the ribbon according to the second priority order, to create a set of reordered user-selectable tabs;

transmit the second priority order to the client computer system to alter presentation of the set of reordered user-selectable tabs;

present the search results in the second priority order and according to the set of reordered user-selectable tabs, by:

receiving a user input selection of a first user-selectable tab associated with a first one of the entities, the set of reordered user-selectable tabs including the first user-selectable tab;

identifying, in response to the user input selection, a first subset of the search results associated with the first one of the entities; and displaying the first subset on a first user-selectable tab associated with the first one of the entities; and present a truncated list of the set of search results, based on the second priority order, the truncated list comprising component truncated lists of the set of search results, and each of the component truncated lists being associated with a respective one of the entities, and each of the component truncated lists comprising a heading associated with a respective one of the entities.

10. The system of claim 9, wherein:

the server system is further configured to:

create a summary of the set of search results based on the second priority order, the summary comprising the component truncated lists of the set of search results; and communicate the summary to the client computer system; and the client computer system is further configured to:

present the summary on a static graphical element of the GUI, the static graphical element being positioned outside of the second priority order; and present each of the component truncated lists on a respective one of the plurality of graphical elements of the GUI, the respective one being associated with a same one of the entities that the component truncated list is associated with.

11. The system of claim 9, wherein:

the server system is further configured to identify a plurality of conversations associated with the search in the software application, the search results comprising at least the plurality of conversations;

the client computer system is further configured to present the plurality of conversations associated with the search as a static graphical element of the GUI; and the static graphical element is positioned outside of the second priority order.

12. A non-transitory, computer-readable medium containing program instructions configurable to cause a processor device to perform a method comprising the steps of:

determining a priority order for a plurality of entities associated with a database of a software application connected to a server, each of the plurality of entities comprising a database object containing data fitted into predefined categories, the database comprising at least the database object, and the priority order prioritizing the plurality of entities in order of most user activity to least user activity;

presenting a set of user search results via a graphical user interface (GUI) of the software application, based on the determined priority order, by:

receiving a user input selection of a first user-selectable tab associated with a first one of the plurality of entities;

identifying, in response to the user input selection, a first subset of the search results associated with the first one of the plurality of entities; and displaying the first subset on a first user-selectable tab associated with the first one of the plurality of entities;

determining a second priority order of the search results, based on user interaction history with each of the plurality of entities, the second priority order prioritizing the plurality of entities in order of most user activity to least user activity; and presenting a truncated list of the set of search results, based on the second priority order, the truncated list comprising component truncated lists of the set of search results, and each of the component truncated lists being associated with a respective one of the entities, and each of the component truncated lists comprising a heading associated with a respective one of the entities;

the GUI comprising at least a search query box and a ribbon of user-selectable tabs arranged in the priority order, each of the user-selectable tabs corresponding to a respective one of the plurality of entities of the software application, and each of the plurality of entities comprising a database object of the database.

13. The non-transitory, computer-readable medium of claim 12, wherein determining the priority order further comprises:

evaluating the user interaction history with the entities to identify activity levels associated with each of the entities;

prioritizing the entities in order of most user activity to least user activity, to create the priority order; and arranging graphical elements associated with the entities in the priority order;

wherein presenting the set of user search results further comprises displaying the search results using the graphical elements.

14. The non-transitory, computer-readable medium of claim 13, wherein displaying the search results using the graphical elements further comprises:

identifying a subset of the search results associated with a first one of the entities; and displaying the subset on the user-selectable tab associated with the first one of the entities, each of the graphical elements comprising a user-selectable tab associated with a respective one of the entities.

15. The non-transitory, computer-readable medium of claim 12, wherein the method further comprises:

detecting a plurality of user-selectable tabs on the user interface, the plurality of user-selectable tabs comprising the first user-selectable tab, each of the plurality of user-selectable tabs being associated with a respective one of the entities, and each of the plurality of user-selectable tabs being configured to present a corresponding subset of the search results associated with the respective one of the entities;

identifying a current placement of each of the plurality of user-selectable tabs; and reorganizing the current placement of each of the plurality of user-selectable tabs, based on the priority order.

16. The non-transitory, computer-readable medium of claim 15, wherein the method further comprises:

identifying an individual one of the entities that is not associated with the plurality of user-selectable tabs;

presenting the individual one of the entities on a drop-down menu, the individual one of the entities being associated with a subset of the search results; and when the individual one of the entities is selected via the drop-down menu, displaying the subset of the search results.

* * * * *